US007825948B2

(12) United States Patent
Van Geest et al.

(10) Patent No.: US 7,825,948 B2
(45) Date of Patent: Nov. 2, 2010

(54) 3D VIDEO CONFERENCING

(75) Inventors: Bartolomeus Wilhelmus Damianus Van Geest, Eindhoven (NL); Marc Joseph Rita Op de Beeck, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1806 days.

(21) Appl. No.: 10/216,412

(22) Filed: Aug. 9, 2002

(65) Prior Publication Data
US 2003/0035001 A1 Feb. 20, 2003

(30) Foreign Application Priority Data
Aug. 15, 2001 (EP) .................................. 01203108

(51) Int. Cl.
*H04N 13/04* (2006.01)
(52) U.S. Cl. ..................................................... 348/51
(58) Field of Classification Search .................. None
See application file for complete search history.

(56) References Cited

U.S. PATENT DOCUMENTS

| 4,805,015 | A | * | 2/1989 | Copeland ..................... 348/48 |
| 4,964,103 | A | * | 10/1990 | Johnson ........................ 367/53 |
| 5,617,334 | A | * | 4/1997 | Tseng et al. ................ 708/203 |
| 5,872,590 | A | | 2/1999 | Aritake |
| 6,020,931 | A | * | 2/2000 | Bilbrey et al. ............... 348/584 |
| 6,055,012 | A | | 4/2000 | Haskell et al. |
| 6,229,913 | B1 | * | 5/2001 | Nayar et al. ................ 382/154 |
| 6,400,362 | B1 | * | 6/2002 | Uchiyama et al. .......... 345/420 |
| 6,445,814 | B2 | | 9/2002 | Iijima |
| 6,609,451 | B1 | * | 8/2003 | Inoue et al. .................. 89/1.13 |
| 6,645,814 | B1 | * | 11/2003 | Lindsay et al. ............. 438/258 |
| 6,647,792 | B2 | * | 11/2003 | Ogawa ......................... 73/656 |
| 6,661,918 | B1 | * | 12/2003 | Gordon et al. ............. 382/173 |
| 6,721,590 | B2 | * | 4/2004 | Ohishi et al. ................ 600/431 |
| 2002/0030678 | A1 | * | 3/2002 | Ostermann .................. 345/420 |

FOREIGN PATENT DOCUMENTS

JP         9289638 A    11/1997

(Continued)

OTHER PUBLICATIONS

Talmi at al: "Eye and gaze tracking for visually controlled interactive stereoscopic displays—an experiment study on the subjective effects of disparity magnitude and depth of focus" Signal Processing. Image Communication, Elsevier Science Publishers, Amsterdam, NL, vol. 14, No. 10, Aug. 1999, pp. 799-810.

(Continued)

*Primary Examiner*—Nhon T Diep
(74) *Attorney, Agent, or Firm*—Larry Lieberchuk

(57) ABSTRACT

A 3D video conferencing station includes a video camera for capturing video signals and a depth map calculator for creating a depth map of a user of the 3D video conferencing station. The video signals together with the depth map are transmitted as 3D video data. A stereoscopic display device displays stereo images, which are calculated on the basis of received 3D video data. The depth map which is generated by the depth map calculator is also used for estimating the position of the user in order to control the calculation of the stereo images.

10 Claims, 4 Drawing Sheets

FOREIGN PATENT DOCUMENTS

Figure 1A:
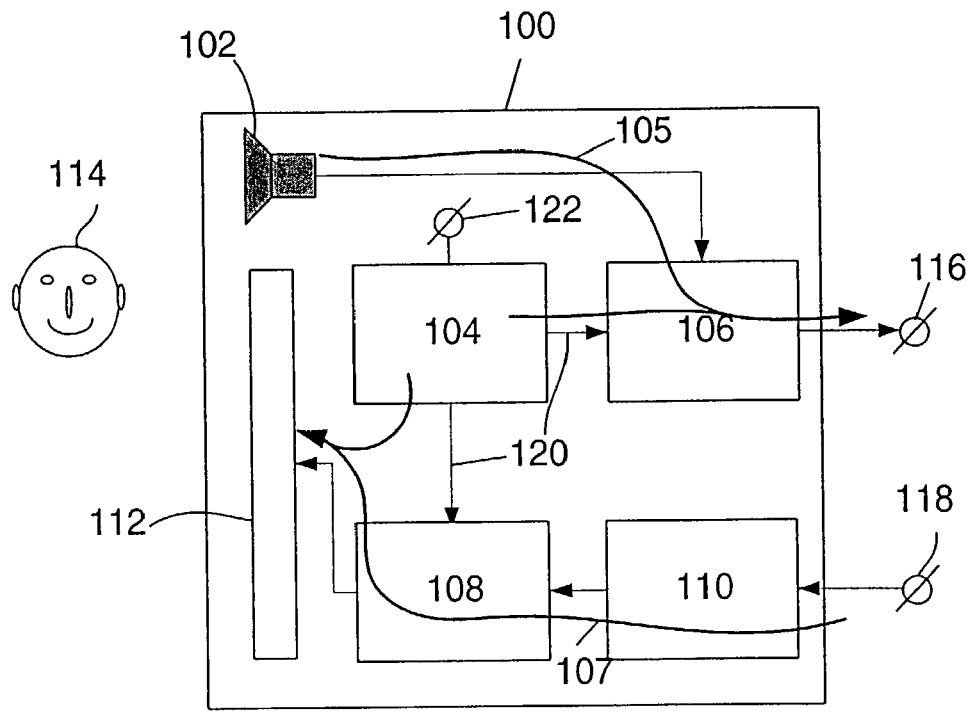

| | | |
|---|---|---|
| JP | 10307923 A | 11/1998 |
| JP | 200076454 A1 | 3/2000 |
| JP | 20011101429 A | 4/2001 |
| JP | 200082147 A | 9/2001 |
| WO | WO9721188 A1 | 6/1997 |
| WO | WO 9940726 A2 | 8/1999 |
| WO | WO9957900 | 11/1999 |
| WO | WO0129767 A | 4/2001 |

OTHER PUBLICATIONS

M. La Cascia et al., "Fast, Reliable Head Tracking Under Varying Illumination: An Approach Based on Registration of Texture-Mapped 3D Models" IEEE Transactions on Pattern Analysis and Machine Intelligence, vol. 22, No. 4, Apr. 2000.

P. Wilinski etal., "Depth from Motion Using Confidence Based Block Matching", Proceedings of Image and Multidimensional Signal Processing workshop, pp. 159-162, Alpbach, Austria, 1998.

3DV Systems, www.3dvsystems.com, Jul. 31, 2001.

* cited by examiner

3D VIDEO CONFERENCING

The invention relates to a 3D video conferencing station and method.

In U.S. Pat. No. 5,872,590 an image display apparatus is described that allows stereoscopic video images to be observed. A position of an observer in a stereoscopic observing region is detected by a position detecting unit. A right-eye image and a left-eye image are formed by an image forming unit and displayed on a display. By setting an aperture position of a projection optical system, the right-eye image is projected to the right-eye position of the observer and the left-eye image is projected to the left-eye position, thereby allowing a stereoscopic image to be observed. The position detecting unit is either based on two magnetic sensors or two ultrasonic sensors. The disadvantage of the approach based on the magnetic sensors is that it is invasive: a special tag is attached to the observer. The disadvantage of the position detecting unit based on ultrasonic sensors is that it is less robust.

It is an object of the invention to provide a 3D video conferencing station and method that are designed to track the position of a user relatively easy. Another aspect of the invention provides an eye-tracking method and device that are especially useful for such a 3D video conferencing station.

The object of the invention is achieved in that the 3D video conferencing station comprises:

a video camera for capturing video signals;

depth means for creating a depth map of a user of the 3D video conferencing station;

a transmitter for transmitting 3D video data which is based on the video signals and the depth map; and a stereoscopic display device for displaying stereo images, which are calculated on the basis of the depth map and received video signals.

The main advantage of the 3D video conferencing station according to the invention is that the depth map is used for two different tasks of the 3D video conferencing station:

The first task is to create 3D video data based on the video signals captured by the camera. The 3D video data enables 3D visualization of the user on a second 3D video conferencing station to which the 3D video data is transmitted. In other words, the depth map is an essential component of the 3D video data which is used by the second 3D video conferencing station. The second 3D video conferencing station will typically be situated on another location.

The second task is to track the position of the user relative to the stereoscopic display device. This position is required to calculate the appropriate images pairs, i.e. stereo images. Based on the position of the user the images pairs are calculated and rendered from 3D video data which is received from the second 3D video conferencing station. In other words, the depth map is used to track the position of the user, or more precisely his eyes, in order to control a part of the 3D video conferencing station itself. Based on the depth map it is relatively easy to determine the position of the user. Additional equipment, e.g. sensors, for user or eye-tracking are not required in the 3D video conferencing station according to the invention.

In an embodiment of the 3D video conferencing station according to the invention, the depth means are arranged to receive a signal from a depth sensor which is registered with the camera. They are both geometrically and in time space linked. The advantage of using a depth sensor which is registered with the camera is that relatively easy depth maps are captured with a relatively high quality.

In another embodiment of the 3D video conferencing station according to the invention, the depth means are designed to create the depth map on the basis of the video signals. The advantage of using the video signals to create the depth map is that no additional depth sensor is required.

An embodiment of the 3D video conferencing station according to the invention comprises a processor for detecting a position of a nose of the user of the 3D video conferencing station by analyzing the depth map. In order to control the creation of stereo pairs which are displayed on the stereoscopic display device, it is important to know the position of the eyes of the user as good as possible. The position of the nose of the user is a good indication of the position of the eyes. The nose can be found relatively easily in a depth map of the user.

In an embodiment of the 3D video conferencing station according to the invention the processor is designed to detect the position of the nose of the user of the 3D video conferencing station by searching for a maximum or a minimum depth value of the depth map. The nose of the user will normally be the part of the face which is located closest to the camera. Hence it corresponds with a maximum or minimum depth value of the depth map, depending on the coordinate system. Finding a maximum or minimum depth value of the depth map is a relatively simple operation.

In another embodiment of the 3D video conferencing station according to the invention, the processor is designed to detect the position of the nose of the user of the 3D video conferencing station by comparing depth values of the depth map with a model of a human face. In the case that the head of the user is at a tilt relative to the camera it might be that the forehead or the chin of the user has a lower/higher depth value or than the depth value corresponding with the nose. By taking multiple depth values of the depth map into account and match these with a model of a human face, a more robust nose detection is achieved.

In another embodiment of the 3D video conferencing station according to the invention, the processor is designed to detect an orientation of a head of the user of the 3D video conferencing station by calculating an average derivative of depth values of a region of the depth map that corresponds with a part of a face of the user. In the case that the head of the user is turned relative to the camera the distance between the position of the nose and the left eye can deviate relatively much from the distance between the position of the nose and the right eye. In that case the position of the nose is a less good indication of the positions of the individual eyes. With the average derivative of depth values of a region of the depth map that corresponds with a part of the face of the user, the orientation of the head can be estimated. With information of the orientation of the head and the position of the nose the position of the eyes can be estimated more accurately.

In an embodiment of the 3D video conferencing station according to the invention, the processor is designed to detect a first position of a left eye and a second position of a right eye based on the position of the nose of the user of the 3D video conferencing station. Information of the position of the nose of the users is a good starting point for controlling the creation of images pairs. With knowledge of the actual position of the eyes an improved control is achieved.

In a preferred embodiment of the 3D video conferencing station according to the invention, the processor is designed to detect the first position of the left eye and the second position of the right eye based on the video signals. Besides the depth map, also the video signals are input for this embodiment of the processor of the 3D video conferencing station. The luminance and optionally chrominance values of the pixels corresponding to the video signals provide additional data, which is very useful to improve the robustness of the eye detection.

In the article "Fast, Reliable Head Tracking under Varying Illumination: An Approach Based on Registration of Texture-Mapped 3D models" of M. La Cascia, et al. in IEEE Transactions on pattern analysis and machine intelligence, Vol. 22, No. 4, April 2000 a technique for 3D head tracking under varying illumination conditions is described. The head is modeled as a texture mapped cylinder. Tracking is formulated as an image registration problem in the cylinders texture mapped image. The resulting dynamic texture map provides a stabilized view of the face that can be used for eye-tracking. The method described in this article is relatively complex for eye tracking compared with the method as performed by the 3D video conferencing station according to the invention.

Modifications of the video conferencing station and variations thereof may correspond to modifications and variations thereof of the eye-tracker and of the method of eye-tracking described.

Figure 1B:
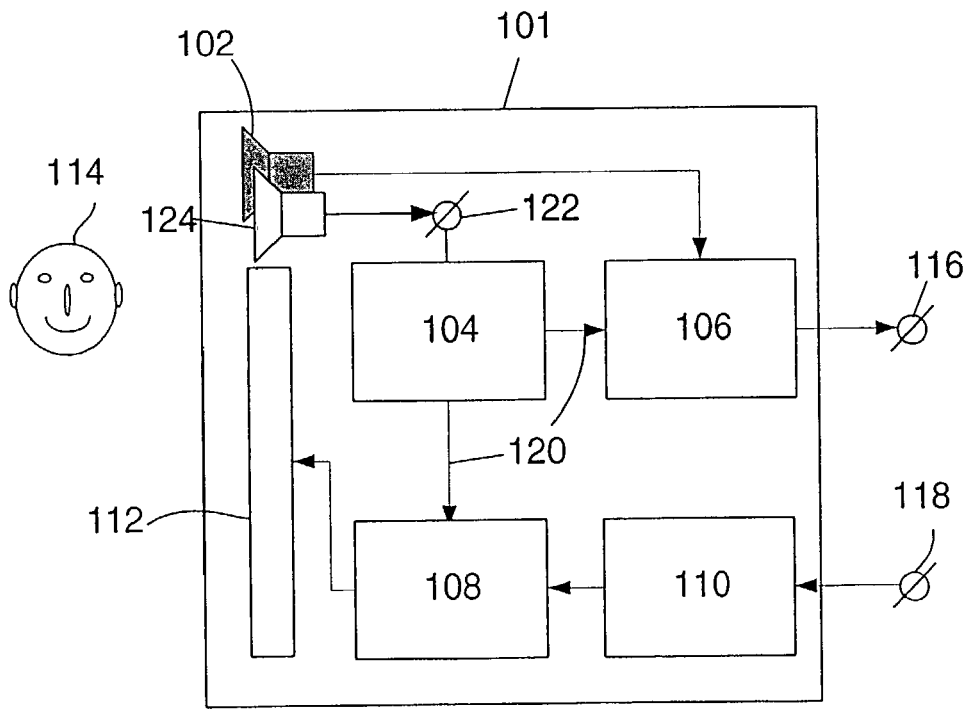
Figure 1C:
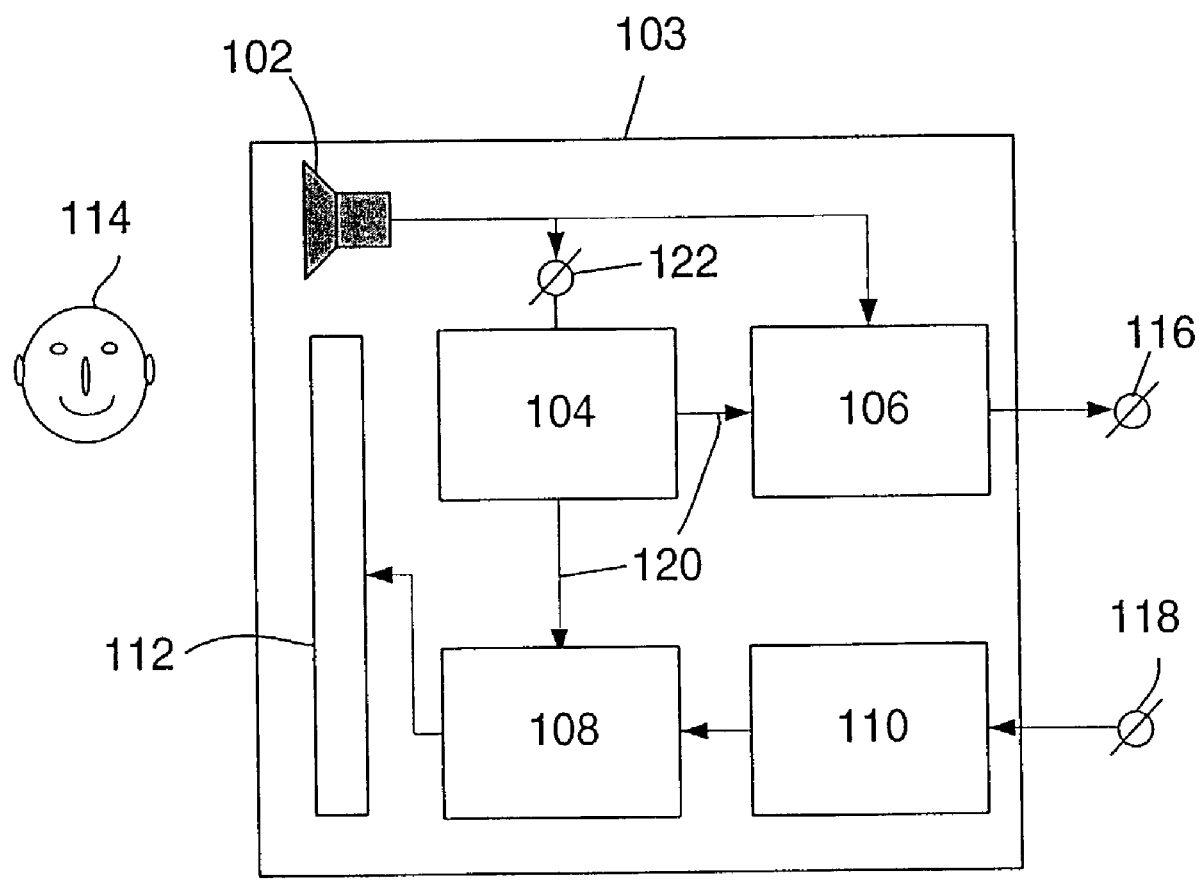
Figure 2A:
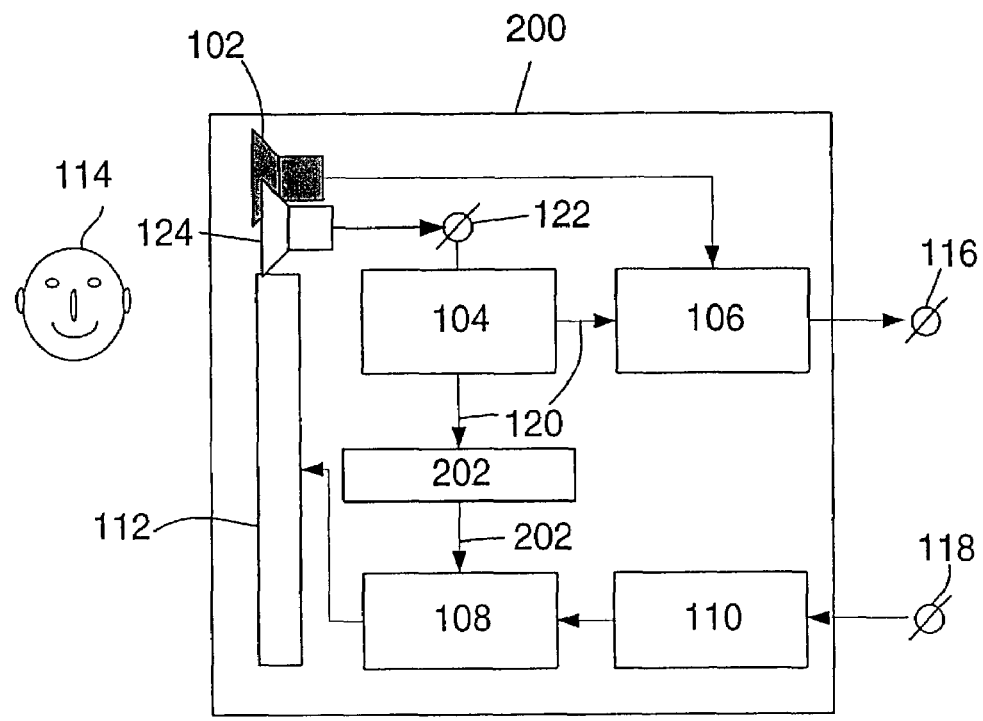
Figure 2B:
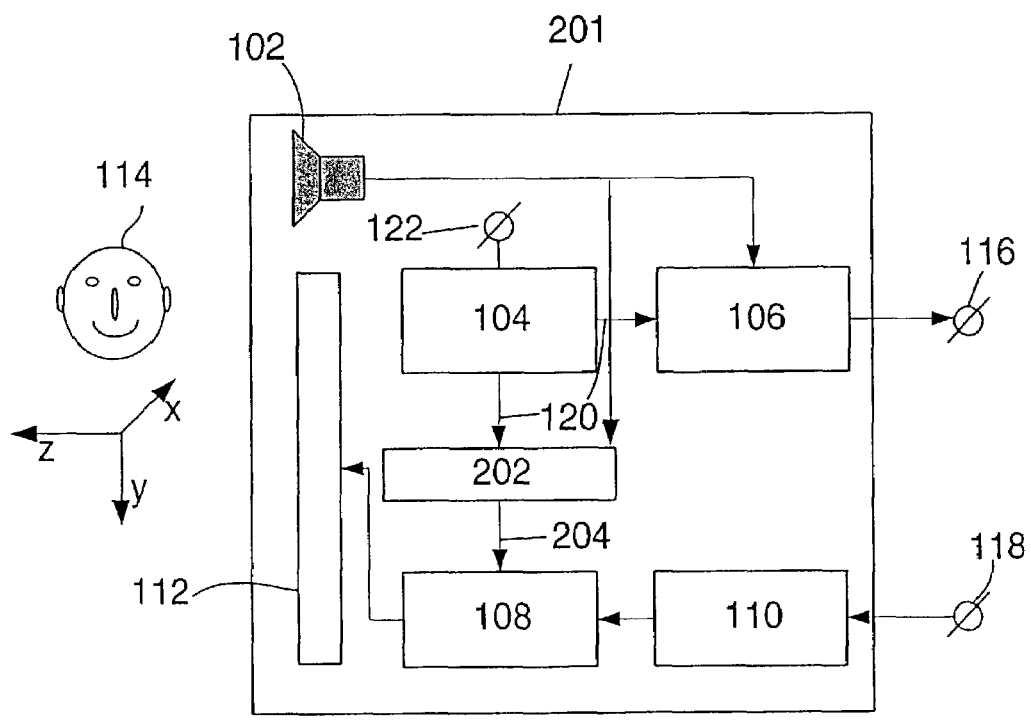
Figure 3:
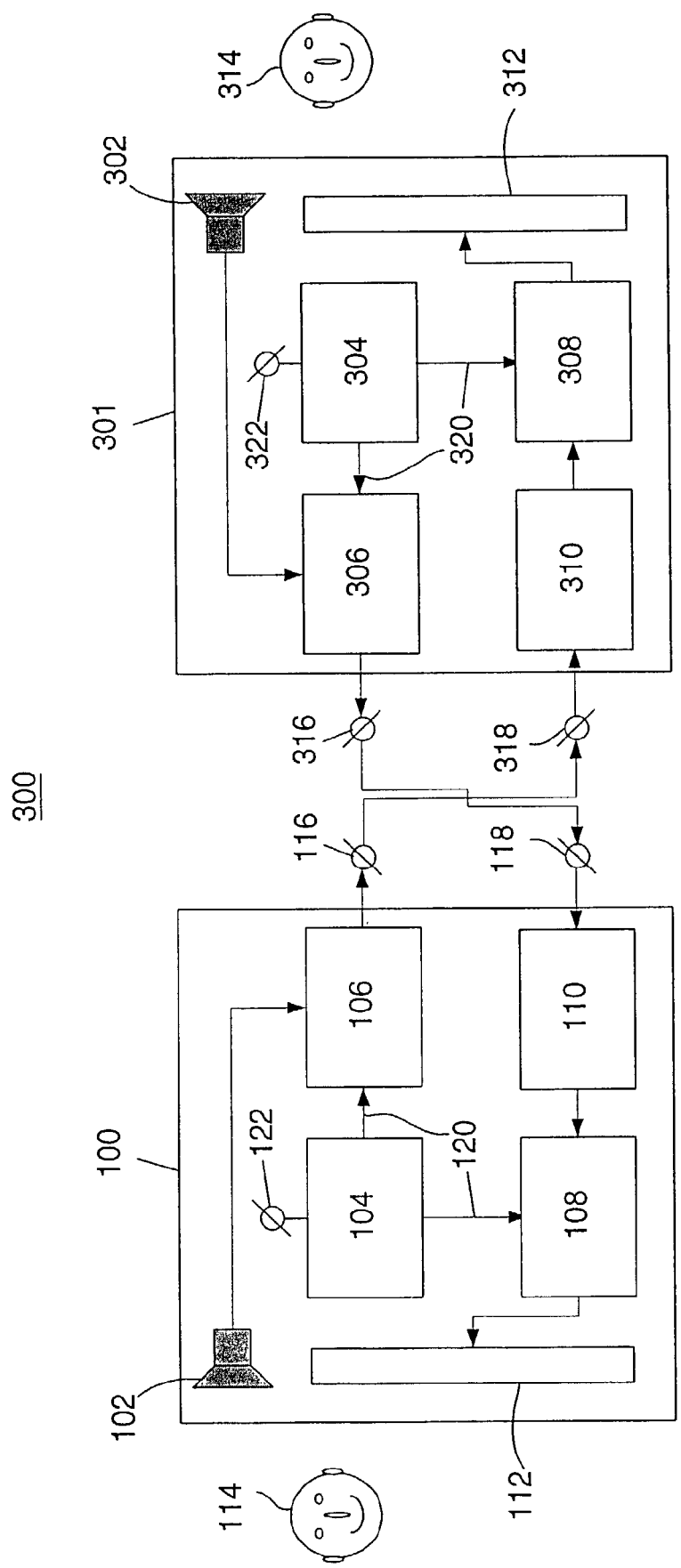

These and other aspects of the 3D video conferencing station and method according to the invention will become apparent from and will be elucidated with respect to the implementations and embodiments described hereinafter and with reference to the accompanying drawings, wherein:

FIG. 1A schematically shows an embodiment of the 3D video conferencing station;

FIG. 1B schematically shows an embodiment of the 3D video conferencing station comprising a depth sensor;

FIG. 1C schematically shows an embodiment of the 3D video conferencing station which is designed to calculate a depth map on the basis of video signals;

FIG. 2A schematically shows an embodiment of the 3D video conferencing station comprising a processor which is designed to detect a position of a nose of the user;

FIG. 2B schematically shows an embodiment of the 3D video conferencing station comprising a processor which is designed to detect the position of the eyes of the user; and FIG. 3 schematically shows a 3D video conferencing system comprising two 3D video conferencing stations according to the invention.

Corresponding reference numerals have the same meaning in all of the Figs.

FIG. 1A schematically shows an embodiment of the 3D video conferencing station 100 comprising:

a video camera 102 for capturing video signals;

a depth map calculator 104 for creating a depth map 120 of a user 114 of the 3D video conferencing station 100;

a transmitter 106 for transmitting 3D video data which is based on the video signals and the depth map 120;

a receiver 110 for receiving 3D video data which has been acquired by a second 3D video conferencing station 301; and a stereo images generator 108 for generating stereo images based on the 3D video data which is received by the receiver 110. The stereo images generator 108 requires information about the position of the user 114. This information is retrieved from the depth map 120 which is generated by the depth map calculator 104; and a stereoscopic display device 112 for displaying the stereo images, which are generated by the stereo images generator 108.

Two main data flows can be distinguished in the 3D video conferencing station 100:

Outgoing data flow 105: First there are video signals which are captured by the video camera 102. These video signals are enhanced with depth maps, resulting in 3D video data. The depth maps are generated by the depth map calculator 104. This 3D video data is transmitted by the transmitter 106. This 3D video data is provided by the 3D video conferencing station 100 at its output connector 116. Optionally the 3D video is encoded, e.g. according to one of the MPEG standard formats.

Incoming data flow 107: Second there is 3D video data which is generated by the second 3D video conferencing station 301. This 3D video data is provided at the input connector 118 and received by the receiver 110. The stereo images generator 108 renders stereo images based on this 3D video data, in dependence of the position of the user 114. The position of the user is determined based on the depth map 120. The generated stereo images are displayed by the stereoscopic display device 112.

FIG. 1B schematically shows an embodiment of the 3D video conferencing station 101 comprising a depth sensor 124. The signals of the depth sensor 124 are provided to the input connector 122 of the depth map calculator 104 for creating a depth map. In this case the depth sensor provides signals which are related to propagation times of waves, e.g. ultrasonic or infrared, which are respectively generated by the depth sensor, reflected by the user and received by the depth sensor. The major task of the depth map calculator 104 is conversion of the signals which are related to propagation times to depth values. Other tasks are e.g. synchronization and temporarily storage of data. Synchronization is required with the video signals which are generated by the video camera 102. The depth sensor 124 and the video camera 102 are both geometrically and in time space linked. In other words, pixels of the video images corresponding with the video signals which are generated by the video camera 102 are spatially and temporarily correlated with the depth maps as created by the depth map calculator 104. Notice that there are systems commercially available which combine the functions of the video camera 102, the depth sensor 124 and the depth map calculator 104, e.g. ZCam™ from 3DV Systems.

FIG. 1C schematically shows an embodiment of the 3D video conferencing station 103 which is designed to calculate a depth map 120 on the basis of video signals. In this case the video signals which are captured by the video camera 102 are also provided to the depth map calculator 104. By applying geometrical relations, the depth information can be deduced from motion. This concept is e.g. described by P. Wilinski and K. van Overveld in the article "Depth from motion using confidence based block matching" in Proceedings of Image and Multidimensional Signal Processing Workshop, pages 159-162, Alpbach, Austria, 1998, and in WO99/40726. All apparent motion in the series of images results from parallax. Differences in motion between one segment and another indicate a depth difference. Analyzing two consecutive images, the parallax between a given image segment at time t and the same segment at t+1 can be computed. This parallax corresponds to the motion of different parts of the scene. In the case of translation of the camera, objects in the foreground move more than those in the background. It is important that there is movement of the user relative to the camera. Whether the camera moves or the user is in principle irrelevant. Optionally multiple cameras are used to capture the video signals. The method of creating a depth map is conceptually the same in that case. Estimating the depth map which is used in the 3D video conferencing station 103 is not limited to the method as described in the cited article, but other depth estimation methods can also be used.

FIG. 2A schematically shows an embodiment of the 3D video conferencing station 200 comprising a processor 202 which is designed to detect a position of the nose of the user. The processor 202 requires a depth map 120 as input and provides coordinates 202 of the position of the nose to the stereo images generator 108. The coordinate system is defined such that points which are close to the 3D video conferencing system 200 have a low depth value, i.e. z-coordinate. The user is looking at the stereoscopic display device 112. The video camera 102 and/or the depth sensor 124 are aligned with the stereoscopic display device 112. As a consequence the nose of the user has a relatively low z-coordinate. The working of the processor is as follows. Each predetermined time interval a new depth map is processed. In the each depth map the lowest depth value is searched. The corresponding x and y coordinates of the tip of the nose are automatically known then too.

Optionally a segmentation is performed of the depth map to determine a region of interest in the depth map corresponding to the face of the user. This segmentation is e.g. performed by means of a threshold operation, i.e. only low depth values are remained. It is assumed that relatively high depth values correspond with other objects in the scene in which the user is located, e.g. the background. The depth values of the region of interest are compared with a model of a human face. In that case the coordinates of the nose are searched with a template matching technique.

Optionally the orientation of the head of the user is estimated. This can be achieved by calculating derivatives of depth values of the region of interest. The assumption is that the head of the user is relatively symmetrical. Comparing derivatives of a left portion of the region of interest with derivatives of a right portion of the region enables to estimate the orientation of the head.

Optionally the location of the nose in depth map N is determined by making use of the detected position based on depth map N−1 which was acquired before. The advantages of this approach are that the detection of the nose of the user can be faster and more robust.

FIG. 2B schematically shows an embodiment of the 3D video conferencing station 201 comprising a processor 202 which is designed to detect the position of the eyes of the user. The processor 202 requires a depth map 120 as input and provides coordinates 204 of the position of the eyes to the stereo images generator 108. With respect to the positions of the right and left eye of the user, since the interval between the human eyes statistically lies in a range from 32.5 mm to 97.5 mm, an interval W between the two eyes is set to, for example W=60 mm and it is sufficient to obtain the x-coordinate values of the respective eyes by adding or subtracting W/2 to/from the coordinate value at the center position between the both eyes. This center position can correspond to the x-coordinate of the tip of the nose. Optionally this center position is based on the x-coordinate of the tip of the nose, but by taking into account the orientation of the head. In that case the distances, in projection, from the eyes to the tip of the nose are not mutually equal.

Optionally the video signals are also input for the processor. The luminance and chrominance values of the pixels corresponding to the video signals provide additional data, which is very useful to improve the robustness of the eye detection. Typically eyes result in high contrast in the images corresponding to the video signals. Also the color of the eyes deviates relatively much from the color of the skin.

FIG. 3 schematically shows a 3D video conferencing system 300 comprising two 3D video conferencing stations 100 and 301 according to the invention. The working of the 3D video conferencing stations 100 and 301 is described in connection with one of the FIGS. 1A, 1B, 2A or 2B. The 3D video conferencing stations 100 and 301 can be connected by means of a private communication link. A public communication link, e.g. internet is also possible. Preferably the 3D video conferencing system allows for concurrent communication between the 3D video conferencing stations 100 and 301. Optionally the 3D video conferencing system 100 comprises more 3D video conferencing stations than the two 3D video conferencing stations 100 and 301.

With the depth map calculator 104 and the processor 202 as shown in FIGS. 2A and 2B an eye-tracker can be constructed which can also be used in various types of systems, e.g. comprising a stereoscopic display device.

Stereoscopic video is used as example of 3D video in the embodiments. Other 3D visualizations are also possible. E.g. a standard 2D display on which a rendered 3D model is rotated in dependence of the observer. Alternatively a multi-view display, e.g. Philips 3D-LCD in combination with multiple video channels can be used. These multiple views are generally projected in fixed directions. Knowledge of the position of the observer can be applied to control these directions. A third alternative are multi-depth-layer displays.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. A 3D video conferencing station comprising:
   a video camera for capturing video signals;
   depth means for creating a depth map of a user of the 3D video conferencing station;
   a transmitter for transmitting 3D video data which is based on the video signals and the depth map depth-image-based rendering;
   a processor for comparing depth values of the depth map with a model for detecting a position of at least a part of the user; and
   a stereoscopic display device for displaying stereo images, which are calculated on the basis of the detected position, the depth map and received video signals, wherein the depth means are arranged to receive a signal from a depth sensor which is registered with the camera.

2. The 3D video conferencing station as claimed in claim 1, wherein the depth means are designed to create the depth map on the basis of the video signals.

3. The 3D video conferencing station as claimed in claim 1, wherein the processor detects the position of the part of the user, the part being a nose of the user.

4. The 3D video conferencing station as claimed in claim 3, wherein the processor is designed to detect the position of the nose of the user of the 3D video conferencing station by searching for a maximum or a minimum depth value of the depth map.

5. The 3D video conferencing station as claimed in claim 3, wherein the processor is designed to detect the position of the nose of the user of the 3D video conferencing station by comparing depth values of the depth map with the model of a human face.

6. The 3D video conferencing station as claimed in claim 3, wherein the processor is designed to detect a first position of a left eye and a second position of a right eye based on the position of the nose of the user of the 3D video conferencing station.

7. The 3D video conferencing station as claimed in claim 6, wherein the processor is designed to detect the first position of the left eye and the second position of the right eye based on the video signals.

8. The 3D video conferencing station as claimed in claim 1, wherein the part of the user is a head, the processor being operative to detect an orientation of the head of the user by calculating an average derivative of depth values of a region of the depth map that corresponds with a part of a face of the user to detect an orientation of a head of the user by calculating an average derivative of depth values of a region of the depth map that corresponds with a part of a face of the user.

9. A 3D video conferencing method comprising:
   capturing video signals;
   creating a depth map of a user of the 3D video conferencing station;
   transmitting 3D video data which is based on the video signals and the depth map;
   comparing depth values of the depth map with a model to detect a position of at least a part of the user; and
   displaying stereo images, which are calculated on the basis of the detected position of at least the part of the user and received video signals, wherein depth means are arranged to receive a signal from a depth sensor which is registered with a camera.

10. A video conferencing system comprising:
   a camera configured to image a local user and output video signals representing said local user;
   a depth calculator configured to calculate a depth map of said local user based on said video signals;
   a transmitter configured to transmit three dimensional video data of said local user, said three dimensional video data being obtained from said video signals and said depth map;
   a processor configured to track a position of said local user based on said depth map;
   a receiver configured to receive video information of a remote user;
   a stereo image generator configured to form a stereo image signal of said remote user from said video information of the remote user and in dependence of said position of said local user, said position being determined based on said depth map; and
   a display configured to display a three dimensional image of said remote user in response to said stereo image signal.

* * * * *